(12) United States Patent
Krishnamoorthy

(10) Patent No.: US 11,436,830 B2
(45) Date of Patent: Sep. 6, 2022

(54) COGNITIVE ROBOTIC PROCESS AUTOMATION ARCHITECTURE

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 400 days.

(21) Appl. No.: 16/815,382

(22) Filed: Mar. 11, 2020

(65) Prior Publication Data

US 2021/0287005 A1    Sep. 16, 2021

(51) Int. Cl.

| | |
|---|---|
| *G06V 20/00* | (2022.01) |
| *G06V 20/40* | (2022.01) |
| *G06F 9/445* | (2018.01) |
| *G06N 3/08* | (2006.01) |
| *H04L 67/563* | (2022.01) |
| *G06N 20/00* | (2019.01) |
| *G06Q 10/04* | (2012.01) |

(52) U.S. Cl.
CPC .......... *G06V 20/41* (2022.01); *G06F 9/44505* (2013.01); *G06N 3/08* (2013.01); *G06N 20/00* (2019.01); *G06Q 10/04* (2013.01); *H04L 67/563* (2022.05)

(58) Field of Classification Search
CPC .. G06V 20/41; G06V 20/597; G06F 9/44505; G06F 21/45; G06F 11/3438; G06F 21/316; G06F 16/3329; G06F 17/2765; G06F 17/30604; G06N 3/08; G06N 20/00; G06N 3/0472; G06B 23/024; H04L 67/563; G06K 9/6271; G07F 17/32; G06Q 20/0652; G06Q 10/04; B62D 15/0215

See application file for complete search history.

(56) References Cited

U.S. PATENT DOCUMENTS

| | | |
|---|---|---|
| 5,799,179 A | 8/1998 | Ebcioglu et al. |
| 5,901,308 A | 5/1999 | Cohn et al. |
| 6,081,665 A | 6/2000 | Nilsen et al. |
| 6,301,705 B1 | 10/2001 | Doshi et al. |

(Continued)

FOREIGN PATENT DOCUMENTS

| | | | | |
|---|---|---|---|---|
| AU | 2018203364 B1 | * 10/2018 | ......... | G06F 16/3329 |
| CA | 3085315 A1 | * 6/2019 | ......... | G06F 16/3329 |

(Continued)

*Primary Examiner* — Steven P Sax
(74) *Attorney, Agent, or Firm* — Moore & Van Allen PLLC; Anup Shrinivasan Iyer

(57) ABSTRACT

Systems, computer program products, and methods are described herein for implementing a cognitive robotic process automation (RPA) architecture. The present invention is configured to electronically receive a video file from a repository, wherein the video file demonstrating one or more actions to be executed in a sequential manner on an application programming interface associated with an application; initiate a neural processing graph generator on the video file; generate, using the neural processing graph generator, a conjugate task graph comprising one or more nodes and one or more edges; initiate a neural task engine on the conjugate task graph; and execute, using the neural task engine, the conjugate task graph.

18 Claims, 3 Drawing Sheets

(56) References Cited

U.S. PATENT DOCUMENTS

| | | |
|---|---|---|
| 6,487,716 B1 | 11/2002 | Choi et al. |
| 7,401,323 B2 | 7/2008 | Stall et al. |
| 7,607,066 B2 | 10/2009 | Gertz et al. |
| 8,407,670 B2 | 3/2013 | Hegde et al. |
| 8,438,392 B2 | 5/2013 | Oxford |
| 8,705,082 B2 | 4/2014 | Nakamoto |
| 9,201,646 B2 | 12/2015 | Balachandran |
| 9,311,670 B2 * | 4/2016 | Hoffberg ............ G06Q 20/0652 |
| 9,383,973 B2 | 7/2016 | Villar et al. |
| 9,460,077 B1 | 10/2016 | Casey |
| 9,555,544 B2 | 1/2017 | Bataller et al. |
| 9,600,244 B1 | 3/2017 | Hwang et al. |
| 9,632,771 B2 | 4/2017 | Toub |
| 9,665,467 B2 | 5/2017 | Angwin et al. |
| 9,721,095 B2 | 8/2017 | Levine-Fraiman |
| 9,818,136 B1 * | 11/2017 | Hoffberg ............... G07F 17/32 |
| 10,802,453 B2 * | 10/2020 | Allen, IV ........... G05B 19/0421 |
| 10,929,159 B2 * | 2/2021 | Pallapolu ................ G06V 20/40 |
| 10,999,566 B1 * | 5/2021 | Mahyar ................. G06V 20/41 |
| 2008/0282229 A1 | 11/2008 | Kim et al. |
| 2015/0310195 A1 * | 10/2015 | Bailor ..................... G06F 21/45 |
| | | 726/6 |
| 2016/0117150 A1 | 4/2016 | Kizhakkevalappil et al. |
| 2016/0285708 A1 * | 9/2016 | Papadopoulos ....... H04L 67/563 |
| 2019/0102676 A1 * | 4/2019 | Nazari ................. G06N 3/0472 |
| 2020/0104966 A1 * | 4/2020 | Cella .................... G06V 20/597 |
| 2020/0159855 A1 * | 5/2020 | Iyer .................. G06F 16/24522 |
| 2020/0225655 A1 * | 7/2020 | Cella ..................... G05B 23/024 |
| 2020/0306640 A1 * | 10/2020 | Kolen ...................... A63F 13/67 |
| 2020/0312003 A1 * | 10/2020 | Borovikov ............. A63F 13/52 |
| 2021/0012102 A1 * | 1/2021 | Cristescu ............. G06K 9/6271 |

FOREIGN PATENT DOCUMENTS

| | | | | |
|---|---|---|---|---|
| CA | 3099659 A1 | * | 11/2019 | ......... B62D 15/0215 |
| CA | 2979579 C | * | 2/2020 | ......... G06F 17/2765 |
| CN | 110659390 A | * | 1/2020 | |
| CN | 113272850 A | * | 8/2021 | ............. G06Q 10/04 |
| EP | 3675008 A1 | * | 7/2020 | ........... G06F 11/3438 |
| WO | WO-2008043392 A1 | * | 4/2008 | ....... G06F 17/30604 |
| WO | WO-2015168203 A1 | * | 11/2015 | ............ G06F 21/316 |
| WO | WO-2021012609 A1 | * | 1/2021 | ............. G06F 12/06 |

\* cited by examiner

COGNITIVE ROBOTIC PROCESS AUTOMATION ARCHITECTURE

FIELD OF THE INVENTION

The present invention embraces a system for a cognitive robotic process automation (RPA) architecture.

BACKGROUND

RPA can be used to automate the execution of repetitive and manually intensive activities. RPA's potential benefits are manifold. They can include reducing costs, lowering an amount of work that needs to be done on recurring actions within a specific period, lowering error rates, improving service, reducing turnaround time, increasing the scalability of operations, and improving compliance. However, the RPA is a dynamic space and moving from one automation to another may present many challenges. One such challenge is the lack of a software agnostic solution.

There is a need for a cognitive robotic process automation (RPA) architecture.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing a cognitive robotic process automation (RPA) architecture is presented. The system comprising: at least one non-transitory storage device; and at least one processing device coupled to the at least one non-transitory storage device, wherein the at least one processing device is configured to: electronically receive a video file from a repository, wherein the video file demonstrating one or more actions to be executed in a sequential manner on an application programming interface associated with an application; initiate a neural processing graph generator on the video file; generate, using the neural processing graph generator, a conjugate task graph comprising one or more nodes and one or more edges; initiate a neural task engine on the conjugate task graph; and execute, using the neural task engine, the conjugate task graph, wherein executing further comprises: initiating a robotic process automation (RPA) engine; electronically initiating a visual observation of the video file; localizing a current node and at least one current edge in the conjugate task graph based on at least the visual observation of the video file; and deploying, using the RPA engine, an application execution bot to replicate the one or more actions demonstrated in the video file to be executed on the application programming interface associated with the application based on at least the visual observation of the one or more actions demonstrated in the video file and localizing the current node and the at least one current edge.

In some embodiments, the conjugate task graph maps the one or more actions to a path defined by at least a portion of the one or more nodes and at least a portion of the one or more edges, wherein the one or more actions are observable actions from the video file.

In some embodiments, generating further comprises generating a policy based on at least the conjugate task graph.

In some embodiments, the at least one processing device is further configured to initiate a graph completion network on the conjugate task graph to complete one or more edges that are associated with one or more unobserved actions in the video file.

In some embodiments, the at least one processing device is further configured to initiate an observation encoder on the visual observation of the video file, wherein the observation encoder is configured to encode the visual observation of the one or more actions demonstrated in the video file into one or more states.

In some embodiments, the at least one processing device is further configured to: initiate a task specification interpreter on the video file; parse, using the task specification interpreter, the video file into a plurality of image frames; and generate, using the task specification interpreter, the one or more actions demonstrated in the video file by traversing the plurality of image frame in a sequential manner.

In some embodiments, the at least one processing device is further configured to: initiate a task specification encoder on the one or more actions generated using the task specification encoder; determine, using the task specification encoder, a time series sequence in which the one or more actions are to be executed by the application execution bot; and generate the conjugate task graph based on at least the one or more actions and the time series sequence in which the one or more actions are to be executed.

In some embodiments, the at least one processing device is further configured to: initiate the neural task engine on the conjugate task graph; determine one or more actions and the one or more states, and a current state of the application programming interface based on at least the conjugate task graph; and generate a subsequent action to be executed on the application programming interface based on at least determining the one or more actions, the one or more states, and the current state of the application programming interface.

In some embodiments, the one or more actions are associated with execution of a transfer of resources, wherein the execution of the transfer of resources is implemented via the application programming interface associated with the application.

In some embodiments, the application is a business intelligence application.

In another aspect, a computer implemented method for implementing a cognitive robotic process automation (RPA) architecture is presented. The method comprising: electronically receiving a video file from a repository, wherein the video file demonstrating one or more actions to be executed in a sequential manner on an application programming interface associated with an application; initiating a neural processing graph generator on the video file; generating, using the neural processing graph generator, a conjugate task graph comprising one or more nodes and one or more edges; initiating a neural task engine on the conjugate task graph; and executing, using the neural task engine, the conjugate task graph, wherein executing further comprises: initiating a robotic process automation (RPA) engine; electronically initiating a visual observation of the video file; localizing a current node and at least one current edge in the conjugate task graph based on at least the visual observation of the video file; and deploying, using the RPA engine, an application execution bot to replicate the one or more actions demonstrated in the video file to be executed on the application programming interface associated with the application based on at least the visual observation of the one or more actions demonstrated in the video file and localizing the current node and the at least one current edge.

In yet another aspect, a computer program product for implementing a cognitive robotic process automation (RPA) architecture is presented. The computer program product comprising a non-transitory computer-readable medium comprising code causing a first apparatus to: electronically receive a video file from a repository, wherein the video file demonstrating one or more actions to be executed in a sequential manner on an application programming interface associated with an application; initiate a neural processing graph generator on the video file; generate, using the neural processing graph generator, a conjugate task graph comprising one or more nodes and one or more edges; initiate a neural task engine on the conjugate task graph; and execute, using the neural task engine, the conjugate task graph, wherein executing further comprises: initiating a robotic process automation (RPA) engine; electronically initiating a visual observation of the video file; localizing a current node and at least one current edge in the conjugate task graph based on at least the visual observation of the video file; and deploying, using the RPA engine, an application execution bot to replicate the one or more actions demonstrated in the video file to be executed on the application programming interface associated with the application based on at least the visual observation of the one or more actions demonstrated in the video file and localizing the current node and the at least one current edge.

The idea of executing an unseen task from a single video demonstration using Neural Task Graph Networks is described in "Neural Task Graphs: Generalizing to Unseen Tasks from a Single Video Demonstration," by De-An Huang et al., and "Neural Task Programming: Learning to Generalize Across Hierarchical Tasks" by Danfei Xu et al., which are incorporated by reference herein.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
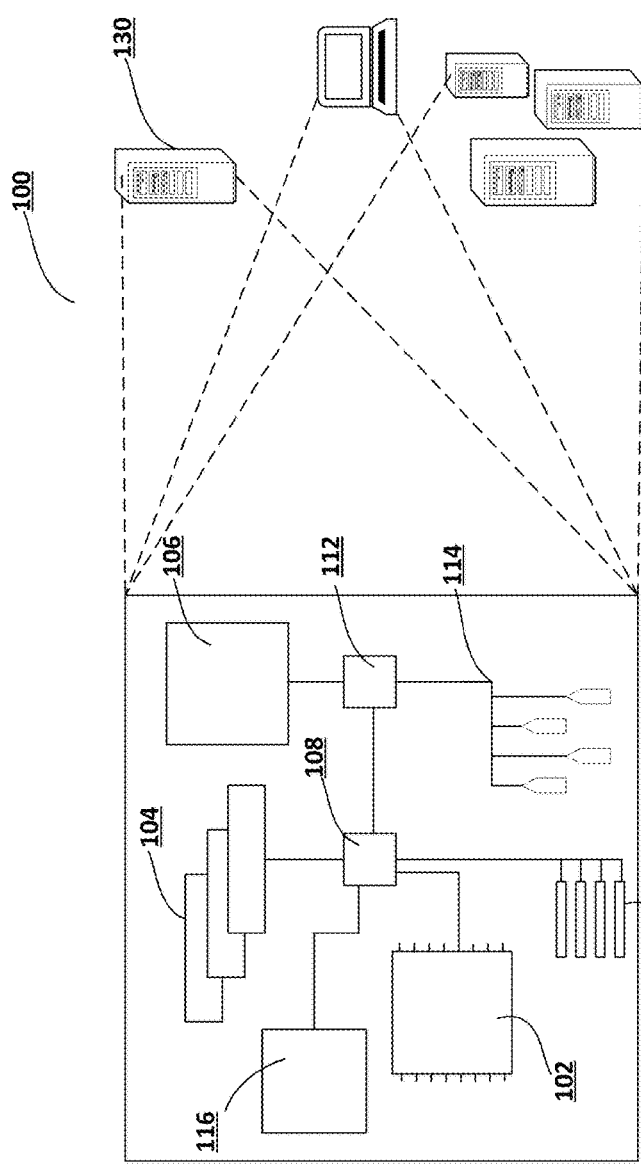
Figure 1:
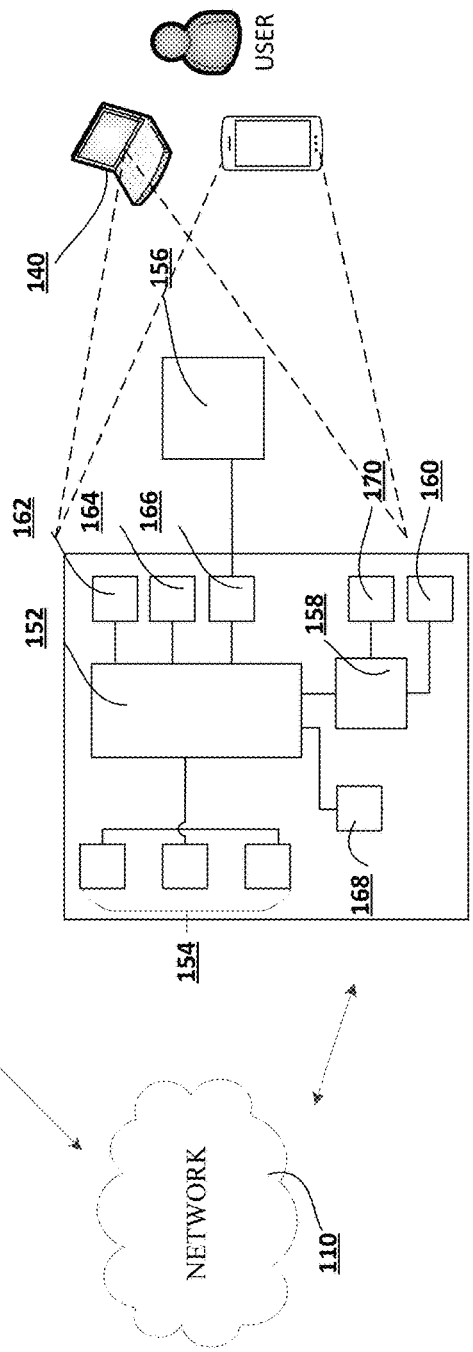
Figure 2:
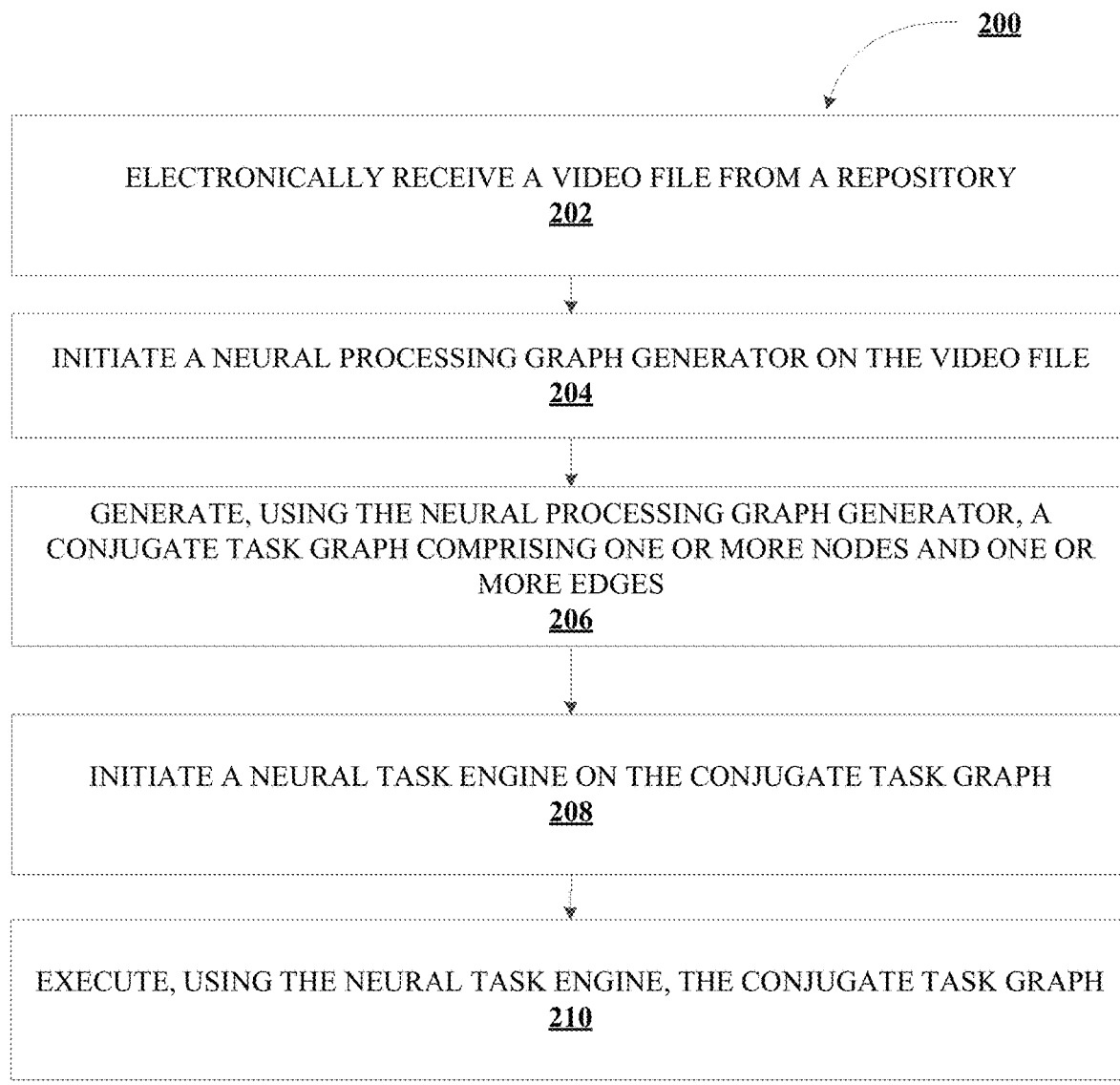

Having thus described embodiments of the invention in general terms, reference will now be made the accompanying drawings, wherein:

FIG. 1 illustrates technical components of a system for implementing a cognitive robotic process automation (RPA) architecture, in accordance with an embodiment of the invention;

FIG. 2 illustrates a process flow for implementing a cognitive robotic process automation (RPA) architecture, in accordance with an embodiment of the invention.

Figure 3:
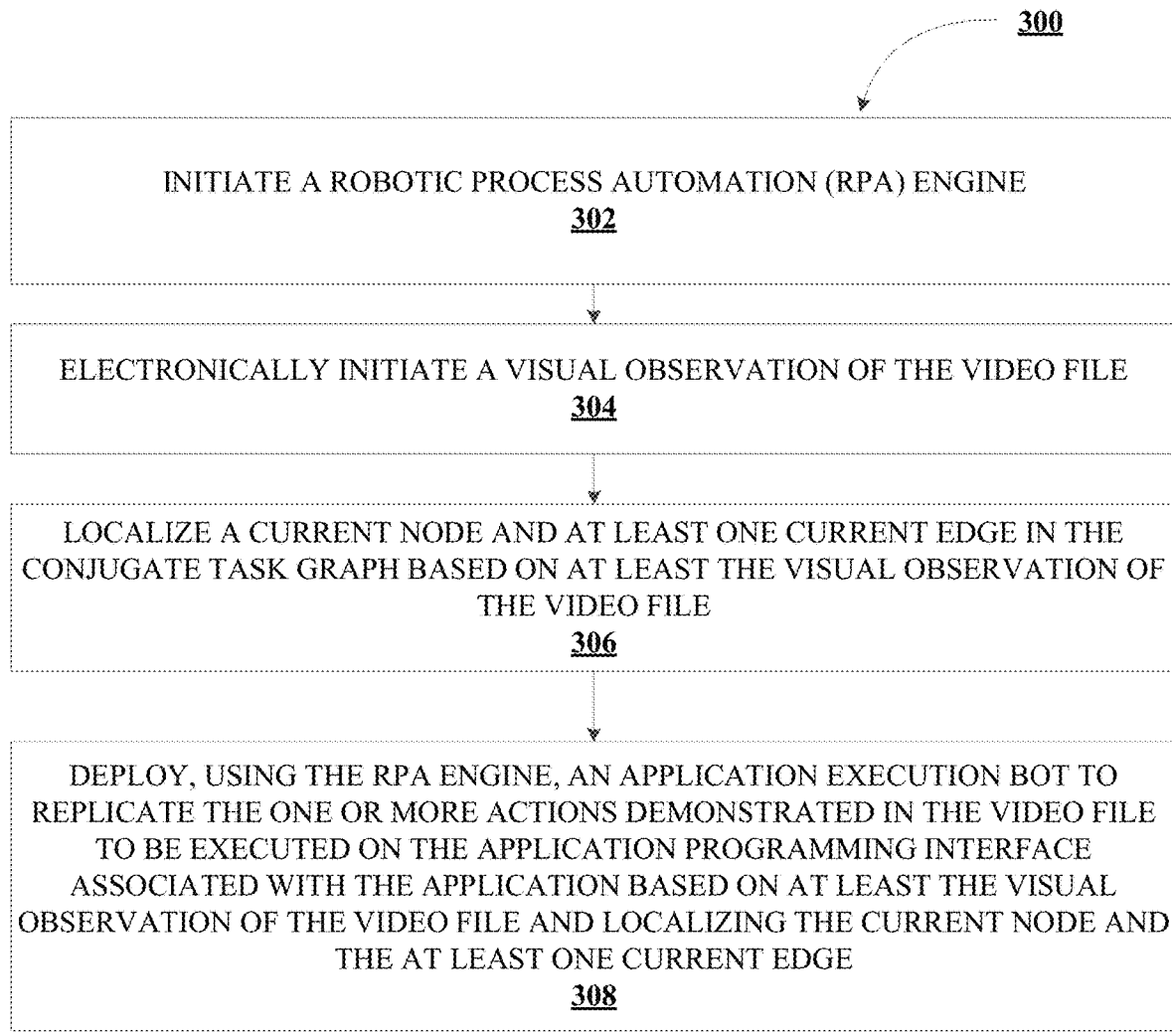

FIG. 3 illustrates a process flow for executing a cognitive robotic process automation (RPA) based on the policy generated from the conjugate task graph, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

FIG. 1 presents an exemplary block diagram of the system environment for implementing a cognitive robotic process automation (RPA) architecture 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In Robotic Process Automation (RPA), a computer system or robot may mimic the actions of a human being in order to perform a computer-based task. In other words, RPA can be used to interact with application software (or application, for short) through its user interface, as a human being would do. Therefore, it is not necessary to integrate RPA with the existing applications at a programming level, thereby eliminating the difficulties inherent to integration, namely bringing together diverse components. In this way, RPA can be used to automate the execution of repetitive and manually intensive activities. RPA's potential benefits are manifold. They can include reducing costs, lowering an amount of work that needs to be done on recurring actions within a specific period, lowering error rates, improving service, reducing turnaround time, increasing the scalability of operations, and improving compliance. Implementing RPA typically includes using a configurable software set up referred to as "bots" to perform the assigned tasks to automate the business process. However, the RPA is a dynamic space and moving from one automation to another may present many challenges. One such challenge is the lack of a software agnostic solution. The present invention uses neural processing graphs to generate a software agnostic policy to complete an unseen task with a single video demonstration of the task in a given business domain where automation is involved. To achieve this, the present invention explicitly incorporates the compositional structure of the tasks into the model.

The goal of the present invention is to generate a policy given a single video demonstration of a sequence of actions being executed on an application programming interface using neural task graphs. This policy is then used to dynamically generate source code for application execution bots using a robotic process automation (RPA) engine. Accordingly, the application execution bots may be configured to mimic the actions shown in the video demonstration and execute identical actions repeatedly and automatically.s FIG. 2 illustrates a process flow for implementing a cognitive robotic process automation (RPA) architecture 200, in accordance with an embodiment of the invention. As shown in block 202, the process flow includes electronically receiving a video file from a repository. In some embodiments, the video file demonstrating one or more actions to be executed in a sequential manner on an application programming interface associated with an application. In some embodiments, the one or more actions are associated with execution of a transfer of resources, wherein the execution of the transfer of resources is implemented via the application programming interface associated with the application. In some embodiments, the application is a business intelligence application.

Next, as shown in block 204, the process flow includes initiating a neural processing graph generator on the video file. In some embodiments, the neural processing graph generator is configured to build an action graph from the from the video file to capture the actions to be executed and the sequence in which the actions are to be executed.

Next, as shown in block 206, the process flow includes generating, using the neural processing graph generator, a conjugate task graph comprising one or more nodes and one or more edges. In some embodiments, the conjugate task graph maps the one or more actions to a path defined by at least a portion of the one or more nodes and at least a portion of the one or more edges, wherein the one or more actions are observable actions from the video file. In one aspect, system may be configured to generate a policy based on at least the conjugate task graph. However, the observable actions in the video file are limited. Any unseen actions may introduce additional states that are never observed during training. Even though unseen actions tend to introduce a number of unobserved states, the number of possible actions is often limited. By generating a conjugate task graph, the present invention represents the actions in the form of one or more nodes and the states are captured by the edges.

In some embodiments, the system may be configured to initiate a graph completion network on the conjugate task graph to complete one or more edges that are associated with one or more unobserved actions in the video file. In one aspect, the system may be configured to generate the task graph based on the observable actions with a valid path traversing the task graph based on the sequence of actions depicted in the video file. However, the task graph is not complete until the unseen edges are added. In some embodiments, the unseen nodes are actions capable of being executed on the application without affecting the final outcome. In one aspect, the graph completion network iteratively traverses through the task graph to update each node and its associated state until the conjugate task graph contains information associated with both observed and unobserved actions and the corresponding states.

Next, as shown in block 208, the process flow includes initiating a neural task engine on the conjugate task graph. In some embodiments, the neural task engine may be configured to generate a policy based on at least the conjugate task graph. Next, as shown in block 210, the process flow includes executing, using the neural task engine, the conjugate task graph.

FIG. 3 illustrates a process flow for executing a cognitive robotic process automation (RPA) based on the policy generated from the conjugate task graph 300, in accordance with an embodiment of the invention. As shown in block 302, the process flow includes initiating a robotic process automation (RPA) engine. As described herein, RPA allows entities to automate task just like a human being was doing them across applications and systems. RPA interacts with the existing technology infrastructure. The tasks to be automated across applications and systems are demonstrated in the video file. In some embodiments, the system may be configured to receive the policy generated based on the conjugate task graph, and dynamically generate source code for one or more application execution bots. In one aspect, the one or more application execution bots may be configured to interact with one or more applications and systems within the technology environment to execute the actions demonstrated in the video file.

Next, as shown in block 304, the process flow includes electronically initiating a visual observation of the video file. In some embodiments, the system may be configured to initiate an observation encoder on the visual observation of the video file, wherein the observation encoder is configured to encode the visual observation of the one or more actions demonstrated in the video file into one or more states. In addition, the system may be configured to initiate a task specification interpreter on the video file. In some embodiments, the task specification interpreter may be configured to parse the video file into a plurality of image frames. In response, the system may be configured to generate, using the task specification interpreter, the one or more actions demonstrated in the video file by traversing the plurality of image frames in a sequential manner.

In some embodiments, the system may be configured to initiate a task specification encoder on the one or more actions generated using the task specification encoder. In one aspect, the task specification encoder may be configured to determine a time series sequence in which the one or more actions are to be executed by the application execution bot. In response, the system may be configured to generate the conjugate task graph based on at least the one or more actions and the time series sequence in which the one or more actions are to be executed.

In some embodiments, the system may be configured to initiate the neural task engine on the conjugate task graph. In response, the system may be configured to determine one or more actions and the one or more states, and a current state of the application programming interface based on at least the conjugate task graph. In response, the system may be configured to generate a subsequent action to be executed on the application programming interface based on at least determining the one or more actions, the one or more states, and the current state of the application programming interface.

Next, as shown in block 306, the process flow includes localizing a current node and at least one current edge in the conjugate task graph based on at least the visual observation of the video file. In some embodiments, the system may be configured to localize the current node in the graph based on the visual observation. As described herein, for a given node, there are multiple outgoing edges for transitions to different actions. While the nodes can be localized based on seen tasks, the system may be configured to localize the edges to generalize the unseen tasks. Therefore, deciding the correct edge requires localizing the edge to correctly infer the underlying states from the visual observations.

Next, as shown in block 308, the process flow includes deploying, using the RPA engine, an application execution bot to replicate the one or more actions demonstrated in the video file to be executed on the application programming interface associated with the application based on at least the visual observation of the one or more actions demonstrated in the video file and localizing the current node and the at least one current edge.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing a cognitive robotic process automation (RPA) architecture, the system comprising:
   at least one non-transitory storage device; and
   at least one processing device coupled to the at least one non-transitory storage device, wherein the at least one processing device is configured to:
      electronically receive a video file from a repository, wherein the video file demonstrating one or more actions to be executed in a sequential manner on an application programming interface associated with an application, wherein the one or more actions are associated with execution of a transfer of resources;
      initiate a neural processing graph generator on the video file;
      generate, using the neural processing graph generator, a conjugate task graph comprising one or more nodes and one or more edges, wherein generating further comprises:
         initiating a task specification interpreter on the video file to generate the one or more actions demonstrated in the video file;
         initiating a task specification encoder on the one or more actions to generate a time sequence in which the one or more actions are to be executed; and
         generating the conjugate task graph based on at least the one or more actions and the time sequence;
      initiate a neural task engine on the conjugate task graph to generate a subsequent action to be executed on the application programming interface; and
      execute, using the neural task engine, the conjugate task graph, wherein executing further comprises:
         initiating a robotic process automation (RPA) engine;
         electronically initiating a visual observation of the video file;
         localizing a current node and at least one current edge in the conjugate task graph based on at least the visual observation of the video file; and
         deploying, using the RPA engine, an application execution bot to replicate the one or more actions demonstrated in the video file to be executed on the application programming interface associated with the application based on at least the visual observation of the one or more actions demonstrated in the video file and localizing the current node and the at least one current edge.

2. The system of claim 1, wherein the conjugate task graph maps the one or more actions to a path defined by at least a portion of the one or more nodes and at least a portion of the one or more edges, wherein the one or more actions are observable actions from the video file.

3. The system of claim 1, wherein generating further comprises generating a policy based on at least the conjugate task graph.

4. The system of claim 1, wherein the at least one processing device is further configured to initiate a graph completion network on the conjugate task graph to complete one or more edges that are associated with one or more unobserved actions in the video file.

5. The system of claim 1, wherein the at least one processing device is further configured to initiate an observation encoder on the visual observation of the video file, wherein the observation encoder is configured to encode the visual observation of the one or more actions demonstrated in the video file into one or more states.

6. The system of claim 5, wherein the at least one processing device is further configured to:
   parse, using the task specification interpreter, the video file into a plurality of image frames; and
   generate, using the task specification interpreter, the one or more actions demonstrated in the video file by traversing the plurality of image frames in a sequential manner.

7. The system of claim 6, wherein the at least one processing device is further configured to:
   determine, using the neural task engine, the one or more actions and the one or more states, and a current state of the application programming interface based on at least the conjugate task graph; and generate the subsequent action to be executed on the application programming interface based on at least determining the one or more actions, the one or more states, and the current state of the application programming interface.

8. The system of claim 1, wherein the execution of the transfer of resources is implemented via the application programming interface associated with the application.

9. The system of claim 8, wherein the application is a business intelligence application.

10. A computer implemented method for implementing a cognitive robotic process automation (RPA) architecture, the method comprising:
    electronically receiving, using one or more computing device processors, a video file from a repository, wherein the video file demonstrating one or more actions to be executed in a sequential manner on an application programming interface associated with an application, wherein the one or more actions are associated with execution of a transfer of resources;
    initiating, using the one or more computing device processors, a neural processing graph generator on the video file;
    generating, using the neural processing graph generator, a conjugate task graph comprising one or more nodes and one or more edges, wherein generating further comprises:
        initiating a task specification interpreter on the video file to generate the one or more actions demonstrated in the video file;
        initiating a task specification encoder on the one or more actions to generate a time sequence in which the one or more actions are to be executed; and
        generating the conjugate task graph based on at least the one or more actions and the time sequence;
    initiating, using the one or more computing device processors, a neural task engine on the conjugate task graph to generate a subsequent action to be executed on the application programming interface; and
    executing, using the neural task engine, the conjugate task graph, wherein executing further comprises:
        initiating a robotic process automation (RPA) engine;
        electronically initiating a visual observation of the video file;
        localizing a current node and at least one current edge in the conjugate task graph based on at least the visual observation of the video file; and
        deploying, using the RPA engine, an application execution bot to replicate one or more actions demonstrated in the video file to be executed on the application programming interface associated with the application based on at least the visual observation of the one or more actions demonstrated in the video file and localizing the current node and the at least one current edge.

11. The method of claim 10, wherein the conjugate task graph maps the one or more actions to a path defined by at least a portion of the one or more nodes and at least a portion of the one or more edges, wherein the one or more actions are observable actions from the video file.

12. The method of claim 10, wherein generating further comprises generating a policy based on at least the conjugate task graph.

13. The method of claim 10, wherein the method further comprises initiating a graph completion network on the conjugate task graph to complete one or more edges that are associated with one or more unobserved actions in the video file.

14. The method of claim 10, wherein the method further comprises initiating an observation encoder on the visual observation of the video file, wherein the observation encoder is configured to encode the visual observation of the one or more actions demonstrated in the video file into one or more states.

15. The method of claim 14, wherein the method further comprises:
    parsing, using the task specification interpreter, the video file into a plurality of image frames; and
    generating, using the task specification interpreter, the one or more actions demonstrated in the video file by traversing the plurality of image frames in a sequential manner.

16. The method of claim 15, wherein the method further comprises:
    determining, using the neural task engine, the one or more actions and the one or more states, and a current state of the application programming interface based on at least the conjugate task graph; and
    generating a subsequent action to be executed on the application programming interface based on at least determining the one or more actions, the one or more states, and the current state of the application programming interface.

17. The method of claim 10, wherein the execution of the transfer of resources is implemented via the application programming interface associated with the application.

18. A computer program product for implementing a cognitive robotic process automation (RPA) architecture, the computer program product comprising a non-transitory computer-readable medium comprising code causing a first apparatus to:
    electronically receive a video file from a repository, wherein the video file demonstrating one or more actions to be executed in a sequential manner on an application programming interface associated with an application, wherein the one or more actions are associated with execution of a transfer of resources;
    initiate a neural processing graph generator on the video file;
    generate, using the neural processing graph generator, a conjugate task graph comprising one or more nodes and one or more edges, wherein generating further comprises:
        initiating a task specification interpreter on the video file to generate the one or more actions demonstrated in the video file;
        initiating a task specification encoder on the one or more actions to generate a time sequence in which the one or more actions are to be executed; and
        generating the conjugate task graph based on at least the one or more actions and the time sequence;
    initiate a neural task engine on the conjugate task graph to generate a subsequent action to be executed on the application programming interface; and
    execute, using the neural task engine, the conjugate task graph, wherein executing further comprises:
        initiating a robotic process automation (RPA) engine;
        electronically initiating a visual observation of the video file;
        localizing a current node and at least one current edge in the conjugate task graph based on at least the visual observation of the video file; and deploying, using the RPA engine, an application execution bot to replicate the one or more actions demonstrated in the video file to be executed on the application programming interface associated with the application based on at least the visual observation of the one or more actions demonstrated in the video file and localizing the current node and the at least one current edge.

\* \* \* \* \*